United States Patent
Osada et al.

(10) Patent No.: US 9,537,145 B2
(45) Date of Patent: Jan. 3, 2017

(54) NEGATIVE ELECTRODE FOR NONAQUEOUS ELECTROLYTE SECONDARY BATTERY AND NONAQUEOUS ELECTROLYTE SECONDARY BATTERY INCLUDING THE SAME

(71) Applicant: Kabushiki Kaisha Toshiba, Minato-ku (JP)

(72) Inventors: Norikazu Osada, Meguro (JP); Takashi Kuboki, Ota (JP); Shinsuke Matsuno, Minato (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/855,604

(22) Filed: Sep. 16, 2015

(65) Prior Publication Data

US 2016/0087264 A1     Mar. 24, 2016

(30) Foreign Application Priority Data

Sep. 19, 2014   (JP) .................................. 2014-191181

(51) Int. Cl.
| | |
|---|---|
| *H01M 4/131* | (2010.01) |
| *H01M 4/133* | (2010.01) |
| *H01M 4/134* | (2010.01) |
| *H01M 4/36* | (2006.01) |
| *H01M 4/38* | (2006.01) |
| *H01M 4/485* | (2010.01) |
| *H01M 4/587* | (2010.01) |
| *H01M 4/13* | (2010.01) |

(Continued)

(52) U.S. Cl.
CPC .............. *H01M 4/364* (2013.01); *H01M 4/13* (2013.01); *H01M 4/386* (2013.01); *H01M 4/483* (2013.01); *H01M 4/587* (2013.01); *H01M 4/625* (2013.01); *H01M 10/0525* (2013.01); *H01M 2004/021* (2013.01)

(58) Field of Classification Search
CPC ........ H01M 4/13; H01M 4/364; H01M 4/386; H01M 4/483; H01M 4/587; H01M 4/625; H01M 2004/021; H01M 10/0525
See application file for complete search history.

(56) References Cited

U.S. PATENT DOCUMENTS

| | | | |
|---|---|---|---|
| 2004/0115535 A1 | 6/2004 | Morita et al. | |
| 2008/0176132 A1 | 7/2008 | Hirose et al. | |

FOREIGN PATENT DOCUMENTS

| | | |
|---|---|---|
| JP | 2004-119176 | 4/2004 |
| JP | 2007-257868 | 10/2007 |

(Continued)

*Primary Examiner* — Brittany Raymond
(74) *Attorney, Agent, or Firm* — Oblon, McClelland, Maier & Neustadt, L.L.P.

(57) ABSTRACT

A negative electrode for a nonaqueous electrolyte secondary battery of the embodiment includes a current collector; and an electrode mixture layer that is formed on the current collector and contains a first particle, a second particle and a binder. The first particle is comprised of silicon, a silicon oxide and a carbonaceous material. The second particle has electron conductivity and an oxygen content of 1% or lower. The electrode mixture layer is characterized in that silicon concentrations in the vicinity of the surface having contact with the current collector and the vicinity of the opposite surface to the surface having contact with the current collector are higher than a silicon concentration at the central part in the thickness direction.

6 Claims, 6 Drawing Sheets

(51) Int. Cl.
*H01M 4/48* (2010.01)
*H01M 4/62* (2006.01)
*H01M 10/0525* (2010.01)
*H01M 4/02* (2006.01)

(56) References Cited

FOREIGN PATENT DOCUMENTS

| | | |
|---|---|---|
| JP | 2010-15932 | 1/2010 |
| JP | 2012-151129 | 8/2012 |

NEGATIVE ELECTRODE FOR NONAQUEOUS ELECTROLYTE SECONDARY BATTERY AND NONAQUEOUS ELECTROLYTE SECONDARY BATTERY INCLUDING THE SAME

CROSS-REFERENCE TO RELATED APPLICATION

This application is based upon and claims the benefit of priority from Japanese Patent Application No. 2014-191181, filed Sep. 19, 2014, the entire contents of which are incorporated herein by reference.

FIELD

Embodiments described herein relate generally to a negative electrode for a nonaqueous electrolyte secondary battery and a nonaqueous electrolyte secondary battery including the same.

BACKGROUND

In recent years, the miniaturization technology for electronic devices has been rapidly developed, and various kinds of portable electronic devices are becoming popular. Also, a battery, which is a power supply for these portable electronic devices, has been required to be miniaturized, and a nonaqueous electrolyte secondary battery having high energy density is attracting attention.

The nonaqueous electrolyte secondary battery obtained by using metallic lithium as a negative electrode active material is characterized in that the battery life is short because a dendritic crystal called dendrite precipitates on a negative electrode during charge although energy density is very high. Also, in this nonaqueous electrolyte secondary battery, dendrite can be grown so as to reach a positive electrode, thereby causing an internal short circuit, and there are problems in safety. Therefore, a carbon material capable of absorbing and desorbing lithium, specifically graphitic carbon, has been used as a negative electrode active material substituted for metallic lithium.

In order to increase the energy density of a nonaqueous electrolyte secondary battery, it has been attempted to use materials having large lithium storage capacity and high density for a negative electrode active material. Examples of such materials include an amorphous chalcogen compound and elements such as silicon and tin which form an alloy with lithium. Among these materials, silicon can absorb lithium until the atomic ratio Li/Si of lithium atoms to silicon atoms reaches 4.4. Thus, the negative electrode capacity per mass of the negative electrode active material (silicon) is about 10 times as large as that of graphitic carbon.

Silicon is characterized in that the volume thereof largely changes associated with the insertion and desorption of lithium in charge and discharge cycle. The volume of a negative electrode also changes associated with the volume change of silicon, and an internal short circuit occurs in a nonaqueous electrolyte secondary battery. Consequently, a nonaqueous electrolyte secondary battery can be in an overdischarged state which is beyond a usual charge and discharge range. When a nonaqueous electrolyte secondary battery is in an overdischarged state, the resistance of an electrode is increased, which causes an excessive electrification and a voltage drop. For these reasons, the temperature of a nonaqueous electrolyte secondary battery is increased, which causes the reduction in cycle life.

DETAILED DESCRIPTION

Hereinafter, embodiments of a negative electrode active material for a nonaqueous electrolyte secondary battery and a nonaqueous electrolyte secondary battery including the same are described with reference to the drawings.

First Embodiment

The first embodiment provides the negative electrode for a nonaqueous electrolyte secondary battery of the embodiment (hereinafter referred to as a "negative electrode") including a current collector; and an electrode mixture layer that is formed on the current collector and contains a first particle, a second particle and a binder.

The first particle is comprised of silicon, a silicon oxide and a carbonaceous material.

The second particle has electron conductivity and an oxygen content of 1% or lower.

The electrode mixture layer is characterized in that silicon concentrations in the vicinity of the surface having contact with the current collector and the vicinity of the opposite surface to the surface having contact with the current collector are higher than a silicon concentration at the central part in the thickness direction.

The negative electrode according to the present embodiment is described as an electrode used for a nonaqueous electrolyte secondary battery, but the negative electrode according to the present embodiment can be used for various batteries.

Hereinafter, the negative electrode according to the present embodiment is described in detail with reference to FIG. 1.

Figure 1:
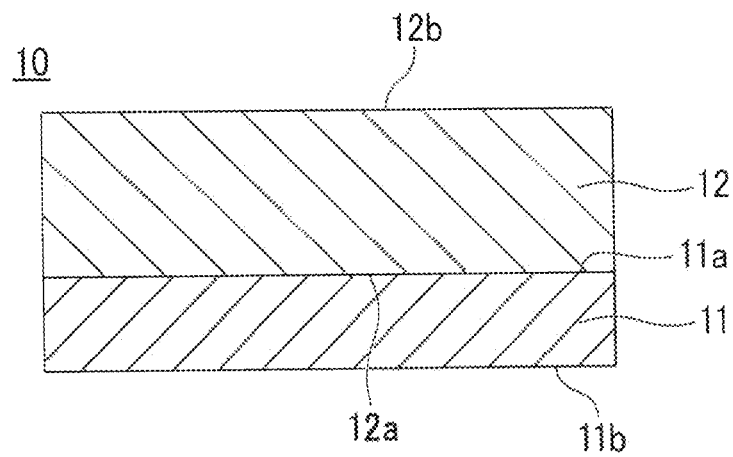
FIG. 1 is a schematic view illustrating the negative electrode according to the first embodiment.

FIG. 1 is a schematic view illustrating the negative electrode according to the present embodiment.

The negative electrode 10 according to the present embodiment includes the negative electrode current collector 11; and the negative electrode mixture layer 12 as shown in FIG. 1.

The negative electrode mixture layer 12 is the layer which is formed on the one surface 11a of the negative electrode current collector 11 and is formed of the mixture containing a binder and a negative electrode material for a nonaqueous electrolyte secondary battery containing a first particle and a second particle (hereinafter may be referred to as a "negative electrode material"). The negative electrode mixture layer 12 contains the negative electrode material and the binder. The binder binds the negative electrode current collector 11 and the negative electrode mixture layer 12. Also, the negative electrode mixture layer 12 can contain an additive such as an electroconductive agent.

The thickness of the negative electrode mixture layer 12 is preferably within a range of 1.0 µm or more and 150 µm or less, and more preferably within a range of 10 µm or more and 80 µm or less. Therefore, when the negative electrode mixture layers 12 are provided on the both surfaces (the one surface 11a and the other surface 11b) of the negative electrode current collector 11, the total thickness of the negative electrode mixture layers 12 is within a range of 2.0 µm or more and 300 µm or less.

When the thickness of the negative electrode mixture layer 12 is within the aforementioned range, the large current discharge characteristics and cycle characteristics of the nonaqueous electrolyte secondary battery including the negative electrode 10 are improved significantly.

Regarding the blending ratio of the negative electrode material, the electroconductive agent and the binder in the negative electrode mixture layer 12, the negative electrode material is preferably blended within a range of 35 mass % or more and 85 mass % or less, the electroconductive agent is preferably blended within a range of 10 mass % or more and 40 mass % or less, and the binder is preferably blended within a range of 5 wt % or more and 25 wt % or less. When the blending ratio of the negative electrode material, the electroconductive agent and the binder is within the aforementioned range, it is possible to obtain the good large current discharge characteristics and cycle characteristics in the nonaqueous electrolyte secondary battery including the negative electrode 10.

The negative electrode material includes the first particle comprised of silicon (Si), a silicon oxide ($SiO_x$) and a carbonaceous material, and the second particle having electron conductivity and an oxygen content of 1% or lower. In other words, the negative material includes a silicon phase comprised of silicon (a Si phase), a silicon oxide phase comprised of a silicon oxide (a $SiO_x$ phase), and a carbonaceous material phase comprised of a carbonaceous material constituting the first particle and a carbonaceous material containing almost no oxygen and having electron conductivity (the second particle).

The negative electrode material can include tin (Sn).

It is preferable that the negative electrode material be comprised of the Si phase, the $SiO_x$ phase and the carbonaceous material phase and that the materials constituting these phases be finely complexed. Also, it is preferable that X of the silicon oxide ($SiO_x$) satisfy the relational expression of $1<X\leq2$.

A large amount of lithium is inserted in or eliminated from the Si phase, and the capacity of the negative electrode is much increased by the Si phase. In the present embodiment, the Si phase is dispersed in the $SiO_x$ phase and the carbonaceous material phase, and therefore, it is reduced that the negative electrode material is expanded or contracted by the insertion and elimination of a large amount of lithium at the silicone phase. As a result, it is possible to prevent the negative electrode material particle from being pulverized. Also, the carbonaceous material phase ensures a sufficient electroconductivity as the negative electrode material. The $SiO_x$ phase is tightly bonded to the Si phase, holds the miniaturized Si phase and exerts the large effect to keep the particle structure.

In the Si phase, the expansion and contraction are large during the absorption and release of lithium. In order to reduce the stress caused by the expansion and contraction, the Si phase is preferably miniaturized as much as possible and dispersed in the $SiO_x$ phase and the carbonaceous material phase. Specifically, it is preferable that the Si phase form a silicon aggregate having a particle size of several nm or more and 500 nm or less and be dispersed in the $SiO_x$ phase and the carbonaceous material phase.

It is preferable that the $SiO_x$ phase be amorphous or crystalline, bonded to the Si phase, and uniformly dispersed in the negative electrode material in the state of including or holding the Si phase.

The carbonaceous material which constitutes the first material is preferably at least one selected from the group consisting of graphite, hard carbon, soft carbon, amorphous carbon and acetylene black, and more preferably the mixture of graphite together with hard carbon or soft carbon. Graphite is preferable because the electroconductivity of the negative electrode material is improved. Also, hard carbon and soft carbon are preferred because they cover the whole negative electrode material (the Si phase, the $SiO_x$ phase and the carbonaceous material phase) and have the large effect to reduce the expansion and contraction of the negative electrode material.

The electroconductivity-improving carbonaceous material such as graphite is used as the carbonaceous material (the electroconductive carbonaceous material) which constitutes the second particle having electron conductivity and an oxygen content of 1% or lower, and examples thereof include graphite, graphene, amorphous carbon, hard carbon and soft carbon.

It is preferable that the carbonaceous material phase include the Si phase and the $SiO_x$ phase and cover the circumference of the Si phase and the $SiO_x$ phase. Also, it is preferable that the carbonaceous material (the first particle) including the Si phase and the $SiO_x$ phase and the electroconductive carbonaceous material (the second particle) exist in the mixed state in the carbonaceous material phase. In this case, the conductive carbonaceous material (the second particle) exists so as to cover the carbonaceous material (the first particle) including the Si phase and the $SiO_x$ phase.

The negative electrode mixture layer 12 is characterized in that the silicon concentrations in the vicinity of the surface 12a having contact with the negative electrode current collector 11 and the vicinity of the opposite surface 12b to the surface 12a having contact with the negative electrode current collector 11 are higher than a silicon concentration at the central part of the negative electrode mixture layer 12 in the thickness direction.

Herein, the opposite surface 12b to the surface 12a having contact with the negative electrode current collector 11 in the negative electrode mixture layer 12 means the surface facing the separator when the nonaqueous electrolyte secondary battery is produced by using the negative electrode 10. The vicinity of the opposite surface 12b to the surface 12a having contact with the negative electrode current collector 11 in the negative electrode mixture layer 12 means the vicinity of the separator in the negative electrode mixture layer 12. This indicates that the negative electrode mixture layer 12 is characterized in that the silicon concentrations are high at the upper part and the lower part in the thickness direction and the silicon concentration is low at the middle part in the thickness direction. In other words, the negative electrode mixture layer 12 shows the state where the silicon concentrations become high/low/high in the thickness direction.

Herein, the vicinity of the surface 12a having contact with the negative electrode current collector 11 in the negative electrode mixture layer 12 is the part between the surface 12a and the surface apart from the surface 12a by ⅖ of the thickness of the negative electrode mixture layer 12. When measuring the specific composition of this vicinity, the measurement is carried out at the position apart from the surface 12a by ⅕ of the thickness of the negative electrode mixture layer 12.

Also, the vicinity of the opposite surface 12b to the surface 12a having contact with the negative electrode current collector 11 in the negative electrode mixture layer 12 is the part between the surface 12b and the surface apart from the surface 12b by ⅖ of the thickness of the negative electrode mixture layer 12. When measuring the specific composition of this vicinity, the measurement is carried out at the position apart from the surface 12b by ⅕ of the thickness of the negative electrode mixture layer 12.

Also, the central part of the negative electrode mixture layer 12 is the part other than the aforementioned vicinity of the surface 12a and the aforementioned vicinity of the opposite surface 12b to the surface 12a. When measuring the specific composition of this central part, the measurement is carried out at the central part in the thickness direction of the negative electrode mixture layer 12.

The ratio A/B, which is the ratio of the silicon concentrations (A) in the vicinities of the surface 12a having contact with the negative electrode current collector 11 and the opposite surface 12b to the surface 12a having contact with the negative electrode current collector 11 to the silicon concentration (B) at the central part of the negative electrode mixture layer 12 in the thickness direction of the negative electrode mixture layer 12, is preferably 0.3 or higher, more preferably 0.6 or higher and much more preferably 1.0 or higher. In addition, the upper limit of the ratio A/B is preferably 5 or lower and more preferably 4 or lower.

Also, the central part of the negative electrode mixture layer 12 means the region within a range of about 35% to 65% of the thickness of the negative electrode mixture layer 12.

The negative electrode mixture layer 12 is characterized in that the first particle concentrations are higher than the second particle concentrations in the vicinity of the surface 12a having contact with the negative electrode current collector 11 and the vicinity of the opposite surface 12b to the surface 12a having contact with the negative electrode current collector 11 in the thickness direction, and that the second particle concentration is higher than the first particle concentration at the central part in the thickness direction.

This indicates that the negative electrode mixture layer 12 is characterized in that the first particle concentrations are higher than the second particle concentrations at the upper part and the lower part in the thickness direction and the second particle concentration is higher than the first particle concentration at the middle part in the thickness direction. In other words, the negative electrode mixture layer 12 shows the state where the first particle concentration becomes high/low/high in the thickness direction and the second particle concentration becomes low/high/low in the thickness direction.

The ratio C/D, which is the ratio of the first particle concentrations (C) in the vicinities of the surface 12a having contact with the negative electrode current collector 11 and the opposite surface 12b to the surface 12a having contact with the negative electrode current collector 11 to the second particle concentration (D) at the central part of the negative electrode mixture layer 12 in the thickness direction of the negative electrode mixture layer 12, is preferably 0.3 or higher and more preferably 0.6 or higher. In addition, the upper limit of the ratio C/D is preferably 5 or lower, more preferably 4 or lower and much more preferably 3 or lower.

In the negative electrode mixture layer 12, the first particle content is preferably 50 mass % or higher, more preferably 50 mass % or higher and 95 mass % or lower, and much more preferably 50 mass % or higher and 90 mass % or lower when the total mass of the first particle and the second particle is defined as 100 mass %.

It is preferable that 10% diameter of the particle size distribution of the first particle be less than 10% diameter of the particle size distribution of the second particle, and 90% diameter of the particle size distribution of the first particle be more than 90% diameter of the particle size distribution of the second particle.

It is preferable that 10% diameter of the particle size distribution of the first particle be less than 3.1 μm, 90% diameter of the particle size distribution of the first particle be 6 μm or more, 10% diameter of the particle size distribution of the second particle be 3.1 μm or less, and 90% diameter of the particle size distribution of the second particle be 5 μm or more.

When the particle size distributions of the first particle and the second particle are within the aforementioned ranges, it is indicated that the first particle has the bigger particle and the smaller particle than the second particle.

The binder fills the gaps among the dispersed negative electrode materials, binds the negative electrode material and the electroconductive agent, and binds the negative electrode material and the negative electrode current collector 11.

Examples of the binder include polytetrafluoroethylene (PTFE), polyvinylidene fluoride (PVdF), polyacrylic acid, polysaccharides such as alginic acid and cellulose and the derivatives thereof, an ethylene-propylene-diene copolymer (EPDM), styrene-butadiene rubber (SBR), polyimide, polyamide, and polyamide-imide. Of these, the polymers such as polyimides having an imide structure are more preferable because the binding force for the negative electrode current collector 11 is high and the binding force between the negative electrode materials is enhanced.

The binder can be used alone or in combination of two or more.

When the binder is used in combination of two or more, the life property of the negative electrode 10 can be improved by employing the combination of the binder having excellent binding property for the negative electrode materials and the binder having excellent binding property for the negative electrode material and the negative electrode current collector 11, or the combination of the binder having high hardness and the binder having excellent flexibility.

The negative electrode current collector 11 is the electroconductive member to be bound with the negative electrode mixture layer 12. As the negative electrode current collector 11, it is possible to use an electroconductive substrate having a porous structure or a non-porous electroconductive substrate. These electroconductive substrates can be formed of an electroconductive material such as copper, nickel, alloys thereof or stainless steel. Of these electroconductive materials, copper (including a copper alloy) or stainless steel is the most preferable in terms of electroconductivity.

The thickness of the negative electrode current collector 11 is preferably within a range of 5 μm to 20 μm. When the thickness of the negative electrode current collector 11 is within the range, it is possible to achieve the balance between electrode strength and reduction in weight.

Next, the production method of the negative electrode material according to the present embodiment is described.

As the raw material of the silicon constituting the Si phase and the $SiO_x$ phase, the silicon oxide ($SiO_y$, 0.8≤y≤1.5) is preferably used. In order to set the ratio of the Si phase and the $SiO_x$ phase within the favorable range, it is particularly preferable that the formula of y≈1 be satisfied in $SiO_y$.

The shape of $SiO_y$ is powder, and the average particle size is preferably 200 nm ore more and 800 nm or less.

$SiO_y$ is separated in the burning step described below into the minute Si phase and the minute $SiO_x$ phase. In order to secure the electroconductivity to the dispersed Si phase, it is preferable that the average particle size of $SiO_y$ be as small as possible.

When the average particle size of $SiO_y$ is large, the insulative $SiO_x$ phase thickly covers the Si phase at the central part of the particle, which inhibits the function of the insertion and elimination of lithium as the negative electrode material. For this reason, the average particle size of $SiO_y$ is preferably 800 nm or less. Meanwhile, when $SiO_y$ is exposed to the atmosphere, the surface thereof is oxidized, and $SiO_y$ is converted into $SiO_x$ (1<x≤2). For this reason, when the particle size of $SiO_y$ is extremely reduced, the surface area is increased, the $SiO_x$ is produced on the surface, and the composition becomes unstable.

As the raw material of the carbonaceous material, it is possible to use the carbonized material such as graphite, acetylene black, carbon black or hard carbon. In addition, it is possible to use the non-carbonized material which forms the carbonaceous materials by being heated (carbonized) in an inert atmosphere such as pitch, a resin or a polymer. Also, as the raw material of the carbonaceous material, it is preferable to use the combination of the material having excellent electrical conductivity such as graphite or acetylene black and the non-carbonized materials such as pitch or a polymer.

By melting or polymerizing the material such as pitch or a polymer with $SiO_x$ at the pre-burning stage, it is possible to include $SiO_y$ in the carbonaceous material.

In the production method of the negative electrode material according to the present embodiment, the raw material of silicon and the raw material of the carbonaceous material are mixed at a predetermined ratio (mass ratio), and the mixture was burned to thereby obtain the negative electrode material.

The temperature for burning the aforementioned mixture is preferably 800° C. or higher and 1400° C. or lower in order to prevent the production of SiC. Because this burning temperature range is relatively low, the material such as pitch or a polymer is carbonized, but the ratio of the carbide converted into graphite is not increased. In order to increase the electroconductivity of the negative electrode material, the electroconductive agent such as graphite or acetylene black is needed.

The precursor of the negative electrode material is prepared by mixing $SiO_y$ and the carbonaceous material. When pitch is used as a carbonaceous material, $SiO_y$ and graphite, etc. are mixed in the melted pitch, and the mixture is cooled so as to be solidified. Moreover, the solid product is pulverized and the surface thereof is oxidized so as to infusibilize the powder, to thereby obtain the precursor of the negative electrode material. The precursor obtained in this manner is burned so as to carbonize the pitch, to thereby obtain the negative electrode material.

Also, when a polymer is used as a carbonaceous material, $SiO_y$ and graphite, etc. are dispersed in monomers, and the monomers are polymerized in this state, to thereby obtain the precursor of the solidified negative electrode material. The precursor obtained in this manner is burned so as to carbonize the polymer, to thereby obtain the negative electrode material.

The treatment of burning the carbonaceous material such as pitch or a polymer so as to be carbonized is carried out under the atmosphere of an inert gas such as argon (inert atmosphere). In this burning treatment, the carbonaceous material such as pitch or a polymer is carbonized, and $SiO_y$ is separated by the disproportionation reaction into two phases of the Si phase and the $SiO_x$ phase. When x of $SiO_x$ represents 2 and y of SiOy represents 1, the reaction, in which $SiO_y$ is separated into two phases of the Si phase and the $SiO_x$ phase, is represented by the following chemical formula (1).

$$2SiO \rightarrow Si + SiO_2 \qquad (1)$$

This disproportionation reaction proceeds at a temperature of 800° C. or higher, and $SiO_y$ is separated into the minute Si phase and the minute $SiO_x$ phase. However, at a temperature higher than 1,400° C., Si and carbon are reacted so as to produce SiC. For this reason, the temperature of the burning treatment is preferably 800° C. or higher and 1,400° C. or lower and more preferably 900° C. or higher and 1,100° C. or lower. Also, the burning time is preferably within a range of about 1 hour to 12 hours.

The negative electrode material according to the present embodiment can be obtained by the synthetic method described above. Also, the obtained negative electrode material is provided as the negative electrode material constituting the negative electrode mixture layer 12 after the particle size and the specific surface area, etc. have been adjusted by using various mills or a milling apparatus.

Next, the production method of the negative electrode 10 is described.

Firstly, the negative electrode material, the electroconductive agent and the binder are suspended in a general solvent so as to prepare a slurry.

Subsequently, the slurry is applied onto the one surface 11a of the negative electrode current collector 11 followed by drying to form the negative electrode mixture layer 12. Then, the negative electrode mixture layer 12 is subjected to pressing, to thereby obtain the negative electrode 10.

Because the aforementioned slurry is used in the production method of the negative electrode according to the present embodiment, the particle size distribution of the first particle is wider than the particle size distribution of the secondary particle. Also, the solid content ratio in the slurry is low, and the viscosity is low. Therefore, when the slurry is applied onto the negative electrode current collector 11, among the first particles, the particles having a large particle diameter sink to the side of the negative electrode current collector 11, i.e. the lower part side of the negative electrode mixture layer 12. Meanwhile, among the first particles, the particles having a small particle diameter float to the side of the separator, i.e. the upper part side of the negative electrode mixture layer 12. In this manner, when the first particles are unevenly distributed at the upper part and the lower part of the negative electrode mixture layer 12, the concentration of the carbon-containing second particle is increased at the central part of the negative electrode mixture layer 12 as a consequence.

According to the negative electrode 10 for a nonaqueous electrolyte secondary battery, the electrode mixture layer 12 is characterized in that the silicon concentrations in the vicinity of the surface 12a having contact with the current collector 11 and the vicinity of the opposite surface 12b to the surface 12a having contact with the current collector 11 are higher than the silicon concentration at the central part 12 in the thickness direction. For this reason, it is possible to suppress the volume change of the negative electrode containing silicon and silicon oxide which is associated with the insertion and desorption of lithium in charge and discharge cycle, and it is possible to prevent an internal short circuit from occurring in a nonaqueous electrolyte secondary battery.

Second Embodiment

The second embodiment provides the nonaqueous electrolyte secondary battery comprising the negative electrode for a nonaqueous electrolyte secondary battery according to the aforementioned first embodiment, a positive electrode, a nonaqueous electrolyte, a separator and an exterior material.

More specifically, the nonaqueous electrolyte secondary battery according to the present embodiment includes an exterior material, a positive electrode that is housed in the external material, the negative electrode that is spatially separated from the positive electrode and is housed in the external material with a separator interposed therebetween, and a nonaqueous electrolyte charged in the external material.

Hereinafter, the negative electrode, the positive electrode, the nonaqueous electrolyte, the separator and the exterior material, which are constituent members of the nonaqueous electrolyte secondary battery according to the present embodiment, are described in detail.

(1) Negative Electrode

As the negative electrode, the aforementioned negative electrode according to the first embodiment is used.

(2) Positive Electrode

The positive electrode includes the positive electrode current collector and the positive electrode mixture layer that is formed on one surface or both surfaces of the positive electrode current collector and contains a positive electrode active material, an electroconductive agent and a binder. An electroconductive agent and a binder are optional components.

The thickness of the positive electrode mixture layer on one surface is preferably within a range of 1.0 μm or more and 150 μm or less, and more preferably within a range of 20 μm or more and 120 μm or less. Therefore, when the positive electrode mixture layers are provided on the both surfaces of the positive electrode current collector, the total thickness of the positive electrode mixture layers is within a range of 2.0 μm or more and 300 μm or less.

When the thickness of the positive electrode mixture layer is within the aforementioned range, the large current discharge characteristics and cycle characteristics of the nonaqueous electrolyte secondary battery including a positive electrode are improved significantly.

As the positive electrode active material, an oxide or a sulfide can be used. Examples of an oxide and a sulfide include manganese dioxide ($MnO_2$) which absorbs lithium, an iron oxide, a copper oxide, a nickel oxide, a lithium-manganese composite oxide (such as $Li_xMn_2O_4$ or $Li_xMnO_2$), a lithium-nickel composite oxide (such as $Li_xNiO_2$), a lithium-cobalt composite oxide (such as $Li_xCoO_2$), a lithium-nickel-cobalt composite oxide (such as $LiNi_{1-y}Co_yO_2$), a lithium-manganese-cobalt composite oxide (such as $Li_xMn_yCo_{1-y}O_2$), a lithium-manganese-nickel composite oxide (such as $Li_xMn_{2-y}Ni_yO_4$) having a spinel structure, a lithium-phosphorus oxide (such as $Li_xFePO_4$, $Li_xFe_{1-y}Mn_yPO_4$, or $Li_xCoPO_4$) having an olivine structure, iron sulfate ($Fe_2(SO_4)_3$), a vanadium oxide (such as $V_2O_5$), and a lithium-nickel-cobalt-manganese composite oxide. In the aforementioned chemical formulae, x and y satisfy the relational expressions of "0<x≤1" and "0≤y≤1", respectively. As the positive electrode active material, these compounds can be used alone or in combination of two or more.

The positive electrode active material is preferably a compound having a high positive electrode voltage, and more preferable examples of the positive electrode active material include a lithium-manganese composite oxide (such as $Li_xMn_2O_4$), a lithium-nickel composite oxide ($Li_xNiO_2$), a lithium-cobalt composite oxide ($Li_xCoO_2$), a lithium-nickel-cobalt composite oxide ($LiNi_{1-y}Co_yO_2$), a lithium-manganese-nickel composite oxide ($Li_xMn_{2-y}Ni_yO_4$) having a spinel structure, a lithium-manganese-cobalt composite oxide ($Li_xMn_yCo_{1-y}O_2$), a lithium iron phosphate ($Li_xFePO_4$), and a lithium-nickel-cobalt-manganese composite oxide. In the aforementioned chemical formulae, x and y satisfy the relational expressions of "0<x≤1" and "0≤y≤1", respectively.

In the case where an ambient temperature molten salt is used as the nonaqueous electrolyte of the nonaqueous electrolyte secondary battery, preferable examples of the positive electrode active material include a lithium iron phosphate, $Li_xVPO_4F$ (0≤x≤1), a lithium-manganese composite oxide, a lithium-nickel composite oxide, or a lithium-nickel-cobalt composite oxide. Because these compounds have less reactivity with an ambient temperature molten salt, it is possible to improve the cycle life of the nonaqueous electrolyte secondary battery.

The average primary particle size of the positive electrode active material is preferably within a range of 100 nm to 1 μm. When the average primary particle size of the positive electrode active material is 100 nm or more, it is easy to handle in industrial manufacturing. Also, when the average primary particle size of the positive electrode active material is 1 μm or less, it is possible to make the lithium ion diffusion in solid proceed smoothly.

The electroconductive agent improves the current collection performance of the positive electrode active material and suppresses contact resistance between the positive electrode active material and the positive current collector. Examples of the electroconductive agent include agents containing acetylene black, carbon black, artificial graphite, natural graphite, a carbon fiber, and an electroconductive polymer.

The type of the electroconductive agent can be one, or two or more.

The binder fills the gap between the dispersed positive electrode active materials so as to bind the positive electrode active material and the electroconductive agent and to bind the positive electrode active material and the positive electrode current collector.

Examples of the binder include the organic materials such as polytetrafluoroethylene (PTFE), polyvinylidene fluoride (PVdF), and fluorine-based rubber and polyacrylic acid.

The type of the binder can be one, or two or more.

Also, examples of an organic solvent for dispersing the binder include N-methyl-2-pyrrolidone (NMP) and dimethylformamide (DMF).

Regarding the blending ratio of the positive electrode active material, the electroconductive agent and the binder in the positive electrode mixture layer, the positive electrode active material is preferably blended within a range of 50 mass % or more and 95 mass % or less, the electroconductive agent is preferably blended within a range of 3 mass % or more and 18 mass % or less, and the binder is preferably blended within a range of 2 wt % or more and 7 wt % or less. When the blending ratio is within the aforementioned range, it is possible to obtain the good large current discharge characteristics and cycle characteristics in the nonaqueous electrolyte secondary battery including the positive electrode.

The positive electrode current collector is the electroconductive member to be bound with the positive electrode mixture layer. As the positive electrode current collector, an electroconductive substrate having a porous structure or a non-porous electroconductive substrate can be used.

The thickness of the positive electrode current collector is preferably within a range of 8 μm to 15 μm. When the thickness of the positive electrode current collector is within the range, it is possible to achieve the balance between electrode strength and reduction in weight.

Next, the production method of the positive electrode is described.

Firstly, the positive electrode active material, the electroconductive agent and the binder are suspended in a general solvent so as to prepare slurry.

Subsequently, the slurry is applied on the positive electrode current collector followed by drying to form the positive electrode mixture layer. Then, the positive electrode mixture layer is subjected to pressing, to thereby obtain the positive electrode.

Also, the positive electrode can be produced by molding the positive electrode active material, the binder and the electroconductive agent to be blended according to need in a pellet shape to form the positive electrode mixture layer, and disposing this positive electrode mixture layer on the positive electrode current collector.

(3) Nonaqueous Electrolyte

As the nonaqueous electrolyte, a nonaqueous electrolyte solution, an electrolyte-impregnated polymer electrolyte, a polymer electrolyte or an inorganic solid electrolyte are used.

A nonaqueous electrolyte solution is a liquid nonaqueous electrolyte prepared by dissolving an electrolyte in a nonaqueous solvent (an organic solvent), and is held in the gap in the electrode group.

As a nonaqueous solvent, it is preferable to use the solvent which mainly contains the mixed solvent of cyclic carbonates (hereinafter, referred to as the "first solvent") such as ethylene carbonate (EC), propylene carbonate (PC) and vinylene carbonate, and nonaqueous solvents having lower viscosity than the cyclic carbonates (hereinafter, referred to as the "second solvent").

Examples of the second solvent include chain carbonates such as dimethyl carbonate (DMC), diethyl carbonate (DEC) and methylethyl carbonate (MEC); ethyl propionate; methyl propionate; γ-butyrolactone (GBL); acetonitrile (AN); ethyl acetate (EA); toluene; xylene; and methyl acetate (MA). These second solvents can be used alone or in a mixed solvent form of two or more. In particular, it is more preferable that the second solvent have a donor number of 16.5 or less.

It is preferable that the viscosity of the second solvent be 2.8 cPs or less at 25° C. Herein, 1 cPs is converted into 1 mPa·s. The blending percentage of ethylene carbonate or propylene carbonate in the mixed solvent of the first solvent and the second solvent is preferably 1.0 vol % or more and 80 vol % or less, and more preferably 20 vol % or more and 75 vol % or less.

Examples of an electrolyte contained in a nonaqueous electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$) and lithium bistrifluoromethylsulfonimide [$LiN(CF_3SO_2)_2$]. Among these, it is preferable to use lithium hexafluorophosphate or lithium tetrafluoroborate.

It is preferable that the dissolving amount of the electrolyte relative to the nonaqueous solvent contained in nonaqueous electrolyte be 0.5 mol/L or more and 2.0 mol/L or less.

The nonaqueous electrolyte can contain an additive in addition to the nonaqueous solvent (first solvent and second solvent) and the electrolyte.

Examples of an additive include the mixture containing at least two compounds of at least one fluorine-containing compound and at least one fluorine-free compound.

Examples of a fluorine-containing compound include fluoroethylene carbonate (FEC).

Examples of a fluorine-free compound include vinylene carbonate (VC), ethylene sulfite (ES) and propanesultone (PS).

The content of the additive in the nonaqueous electrolyte is preferably within a range of 0.1 mass % or higher and 20 mass % or lower, more preferably within a range of 0.5 mass % or higher and 10 mass % or lower.

The additive is reductively decomposed during charge and discharge, and is deposited on the negative electrode as a SEI (Solid Electrolyte Interface) film.

The materials obtained by reductively decomposing the fluorine-containing compound are selectively deposited on a Si phase or a $SiO_x$ phase.

The materials obtained by reductively decomposing the fluorine-free compound are selectively deposited on the carbonaceous material.

The additive can suppress excessive decompositions of the nonaqueous solvent and the electrolyte.

Herein, a part of the additive is reductively decomposed after initial charge of the nonaqueous electrolyte secondary battery, and forms the film of the negative electrode material. The residue remains in the nonaqueous electrolyte.

Also, the reduction decomposition of the additive occurs between the initial charge of the nonaqueous electrolyte secondary battery and the early charge during 20 or less of charge and discharge cycles, or occurs until all of the additives are consumed in the reductive decomposition.

(4) Separator

The separator is placed between the positive electrode and the negative electrode.

The separator is formed of a porous film such as polyethylene (PE), polypropylene (PP), cellulose or polyvinylidene fluoride (PVdF), or a nonwoven fabric made of a synthetic resin, for example. Among these, a porous film formed of polyethylene or polypropylene is preferable because this kind of film can be melt at a certain temperature so as to block a current, which can improve safety.

The thickness of the separator is preferably 5 μm or more and 30 μm or less, and more preferably 10 μm or more and 25 μm or less. When the thickness of the separator is less than 5 μm, the strength of the separator is significantly deteriorated, and there is the possibility that the internal short circuit is likely to occur. Meanwhile, when the thickness of the separator is more than 30 μm, the distance between the positive electrode and the negative electrode is increased, and there is the possibility that the internal resistance is increased.

When the separator is allowed to stand for 1 hour at 120° C., the thermal shrinkage percentage is preferably 20% or less and more preferably 15% or less. When the thermal shrinkage percentage of the separator is more than 20%, there is the increased possibility that heating causes the short circuit between the positive electrode and the negative electrode.

The porosity of the separator is preferably 30% or more and 70% or less and more preferably 35% or more and 70% or less.

The reason why the porosity of the separator is preferably within the aforementioned range is as follows. When the porosity is less than 30%, there is the possibility that the high electrolyte-holding property cannot be obtained in the separator. Meanwhile, when the porosity is higher than 70%, there is the possibility that the sufficient strength cannot be obtained in the separator.

The air permeability of the separator is preferably 30 seconds/100 cm$^3$ or more and 500 seconds/100 cm$^3$ or less and more preferably 50 seconds/100 cm$^3$ or more and 300 seconds/100 cm$^3$ or less.

When the air permeability is less than 30 seconds/100 cm$^3$, there is the possibility that the sufficient strength cannot be obtained in the separator. Meanwhile when the air permeability is higher than 500 seconds/100 cm$^3$, there is the possibility that the high lithium ion mobility cannot be obtained in the separator.

(5) Exterior Material

As the exterior material which houses the positive electrode, the negative electrode and the nonaqueous electrolyte, a metal container or an exterior container made of a laminated film.

As a metal container, the metal can formed of aluminum, an aluminum alloy, iron or stainless steel in a rectangular or cylindrical shape is used. Also, the thickness of the metal container is preferably 1 mm or less, more preferably 0.5 mm or less and much more preferably 0.2 mm or less.

As an aluminum alloy, an alloy containing an element such as magnesium, zinc or silicon is preferred. When a transition metal such as iron, copper, nickel or chromium is contained in the aluminum alloy, the content of the transition metal is preferably 100 ppm or less. Because the metal container made of the aluminum alloy has the much greater strength than the metal container made of aluminum, the thickness of the metal container can be reduced. As a result, it is possible to realize the thin and lightweight nonaqueous electrolyte secondary battery which has high power and excellent heat radiation property.

Examples of a laminated film include a multi-layer film in which an aluminum foil is coated with a resin film. Usable examples of a resin constituting a resin film include a polymer material such as polypropylene (PP), polyethylene (PE), nylon or polyethylene terephthalate (PET). Also, the thickness of the laminated film is preferably 0.5 mm or less and more preferably 0.2 mm or less. The purity of an aluminum foil is preferably 99.5% or more.

Herein, the present embodiment can be applied to the nonaqueous electrolyte battery having various shapes such as a flat type (thin type), a square type, a cylindrical type, a coin type and a button type.

Also, the nonaqueous electrolyte secondary battery according to the present embodiment can further include a lead which is electrically connected to the electrode group containing the positive electrode and the negative electrode. For example, the nonaqueous electrolyte secondary battery according to the present embodiment can include two leads. In this case, one of the leads is electrically connected to the positive electrode current collector tab and the other lead is electrically connected to the negative electrode current collector tab.

The material of the lead is not particularly limited, but for example, the same material for the positive electrode current collector and the negative electrode current collector is used.

The nonaqueous electrolyte secondary battery according to the present embodiment can further include a terminal which is electrically connected to the aforementioned lead and is drawn from the aforementioned exterior material. For example, the nonaqueous electrolyte secondary battery according to the present embodiment can include two terminals. In this case, one of the terminals is connected to the lead which is electrically connected to the positive electrode current collector tab and the other terminal is connected to the lead which is electrically connected to the negative electrode current collector tab.

The material of the terminal is not particularly limited, but for example, the same material for the positive electrode current collector and the negative electrode current collector is used.

(6) Nonaqueous Electrolyte Secondary Battery

Figure 2:
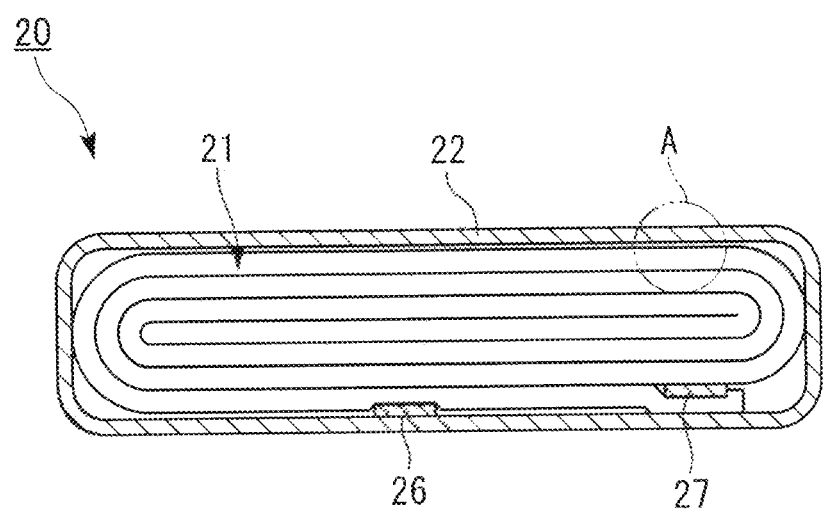
FIG. 2 is a schematic view illustrating the nonaqueous electrolyte secondary battery according to the second embodiment.
Figure 3:
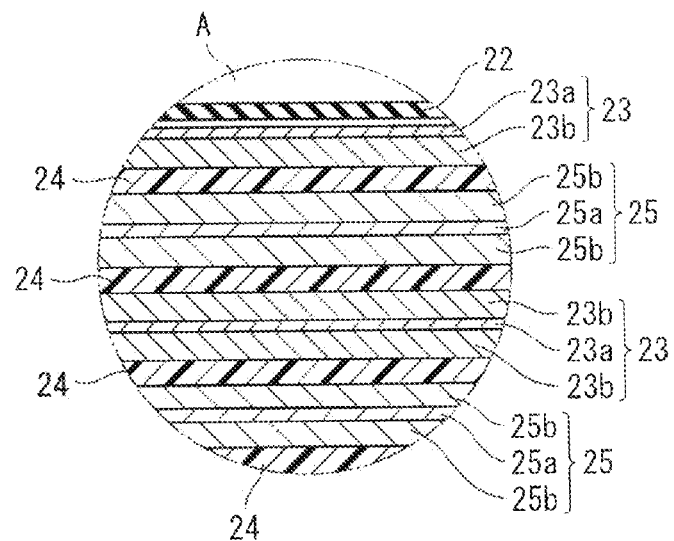
FIG. 3 is a schematic view illustrating the nonaqueous electrolyte secondary battery according to the second embodiment.

Next, the flat type nonaqueous electrolyte secondary battery (nonaqueous electrolyte secondary battery) 20 illustrated in FIG. 2 and FIG. 3 is described as an example of the nonaqueous electrolyte secondary battery according to the present embodiment. FIG. 2 is a schematic sectional view illustrating the cross-section of the flat type nonaqueous electrolyte secondary battery 20. FIG. 3 is an enlarged sectional view illustrating the part A illustrated in FIG. 2. These drawings are schematic diagrams for describing the nonaqueous electrolyte secondary battery according to the embodiment. The shapes, dimensions, ratios, and the like are different from those of actual device at some parts, but design of the shape, dimensions, ratios, and the like can be appropriately modified in consideration of the following description and known technologies.

The flat type nonaqueous electrolyte secondary battery 20 illustrated in FIG. 2 is configured such that the winding electrode group 21 with a flat shape is housed in the exterior material 22. The exterior material 22 may be a container obtained by forming a laminated film in a bag-like shape or may be a metal container. Also, the winding electrode group 21 with the flat shape is formed by spirally winding the laminated product obtained by laminating the negative electrode 23, the separator 24, the positive electrode 25 and the separator 24 from the outside, i.e. the side of the exterior material 22, in this order, followed by performing press-molding. As illustrated in FIG. 3, the negative electrode 23 located at the outermost periphery has the configuration in which the negative electrode layer 23b is formed on one surface of the negative electrode current collector 23a on the inner surface side. The negative electrodes 23 at the parts other than the outermost periphery have the configuration in which the negative electrode layers 23b are formed on both surfaces of the negative current collector 23a. Also, the positive electrode 25 has the configuration in which the positive electrode layers 25*b* are formed on both surfaces of the positive current collector 25*a*. Herein, a gel-like nonaqueous electrolyte can be used instead of the separator 24.

In the vicinity of the outer peripheral end of the winding electrode group 21 illustrated in FIG. 2, the negative electrode terminal 26 is electrically connected to the negative current collector 23*a* of the negative electrode 23 of the outermost periphery. The positive electrode terminal 27 is electrically connected to the positive current collector 25*a* of the inner positive electrode 25. The negative electrode terminal 26 and the positive electrode terminal 27 extend toward the outer portion of the exterior material 22, and are connected to the extraction electrodes included in the exterior material 22.

When manufacturing the nonaqueous electrolyte secondary battery 20 including the exterior material formed of the laminated film, the winding electrode group 21 to which the negative electrode terminal 26 and the positive electrode terminal 27 are connected is charged in the exterior material 22 having the bag-like shape with an opening, the liquid nonaqueous electrolyte is injected from the opening of the exterior material 22, and the opening of the exterior material 22 with the bag-like shape is subjected to heat-sealing in the state of sandwiching the negative electrode terminal 26 and the positive electrode terminal 27 therebetween. Through this process, the winding electrode group 21 and the liquid nonaqueous electrolyte are completely sealed.

Also, when manufacturing the nonaqueous electrolyte battery 20 having the exterior material formed of the metal container, the winding electrode group 21 to which the negative electrode terminal 26 and the positive electrode terminal 27 are connected is charged in the metal container having an opening, the liquid nonaqueous electrolyte is injected from the opening of the exterior material 22, and the opening is sealed by mounting a cover member on the metal container.

For the negative electrode terminal 26, it is possible to use the material having electric stability and electroconductivity within a range of a potential equal to or nobler than 0 V and equal to or lower than 3 V with respect to lithium, for example. Specific examples of this material include aluminum and an aluminum alloy containing an element such as Mg, Ti, Zn, Mn, Fe, Cu or Si. Also, it is more preferable that the negative electrode terminal 26 be formed of the same material as the negative current collector 23*a* in order to reduce the contact resistance with the negative current collector 23*a*.

For the positive electrode terminal 27, it is possible to use the material having electric stability and electroconductivity within a range of a potential equal to or nobler than 2 V and equal to or lower than 4.25 V with respect to lithium. Specific examples of this material include aluminum and an aluminum alloy containing an element such as Mg, Ti, Zn, Mn, Fe, Cu or Si. It is more preferable that the positive electrode terminal 27 be formed of the same material as the positive current collector 25*a* in order to reduce the contact resistance with the positive current collector 25*a*.

Hereinafter, the exterior material 22, the negative electrode 23, the positive electrode 25, the separator 24, and the nonaqueous electrolyte which are constituent members of the nonaqueous electrolyte battery 20 is described in detail.

(1) Exterior Material

As the exterior material 22, the aforementioned exterior material is used.

(2) Negative Electrode

As the negative electrode 23, the aforementioned negative electrode is used.

(3) Positive Electrode

As the positive electrode 25, the aforementioned positive electrode is used.

(4) Separator

As the separator 24, the aforementioned separator is used.

(5) Nonaqueous Electrolyte

As the nonaqueous electrolyte, the aforementioned nonaqueous electrolyte is used.

Figure 4:
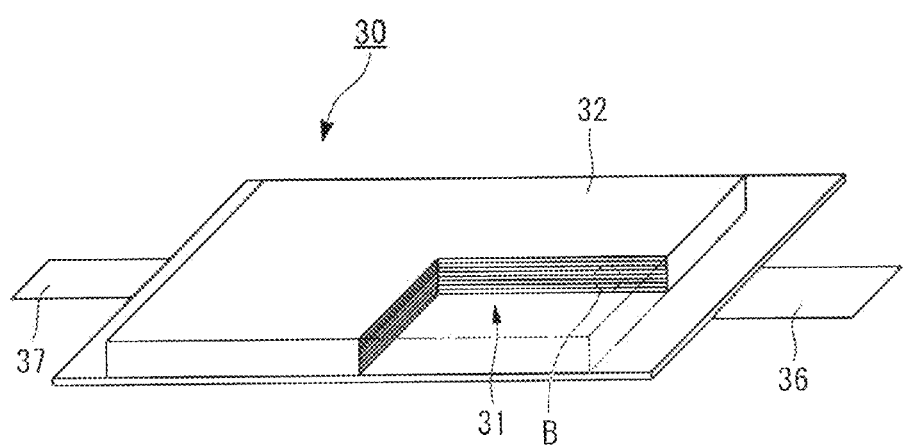
FIG. 4 is a schematic view illustrating the nonaqueous electrolyte secondary battery according to the second embodiment.
Figure 5:
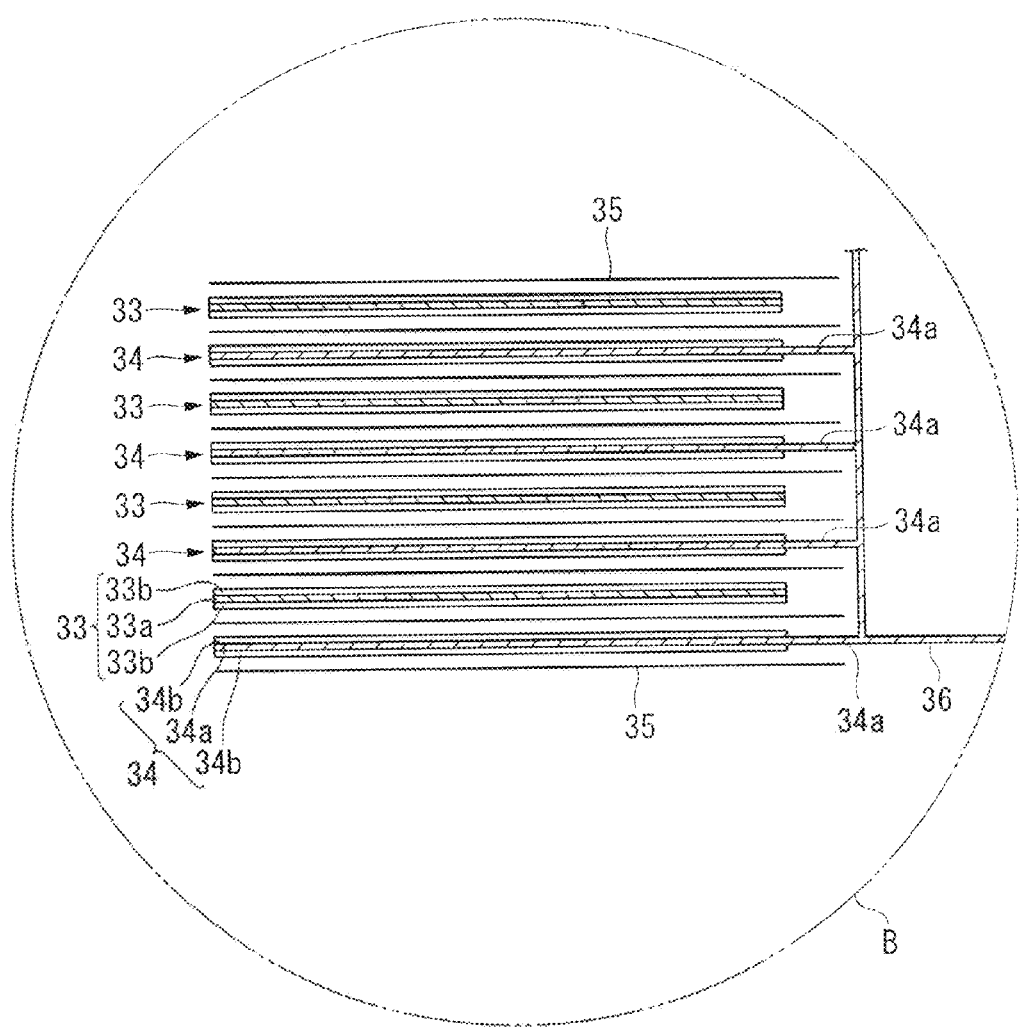
FIG. 5 is a schematic view illustrating the nonaqueous electrolyte secondary battery according to the second embodiment.

The configuration of the nonaqueous electrolyte secondary battery according to the second embodiment is not limited to the aforementioned configuration illustrated in FIG. 2 and FIG. 3. For example, the batteries having the configurations illustrated in FIG. 4 and FIG. 5 can be used. FIG. 4 is a partial cutout perspective view schematically illustrating another flat type nonaqueous electrolyte secondary battery according to the second embodiment. FIG. 5 is an enlarged schematic sectional view illustrating the part B of FIG. 4.

The nonaqueous electrolyte secondary battery 30 illustrated in FIG. 4 and FIG. 5 is configured such that the lamination type electrode group 31 is housed in the exterior member 32. As illustrated in FIG. 5, the lamination type electrode group 31 has the structure in which the positive electrodes 33 and negative electrodes 34 are alternately laminated while interposing separators 35 therebetween.

The plurality of positive electrodes 33 are present and each includes the positive electrode current collector 33*a* and the positive electrode layers 33*b* supported on both surfaces of the positive electrode current collector 33*a*. The positive electrode layer 33*b* contains the positive electrode active material.

The plurality of negative electrodes 34 are present and each includes the negative electrode current collector 34*a* and the negative electrode layers 34*b* supported on both surfaces of the negative electrode current collector 34*a*. The negative electrode layer 34*b* contains the negative electrode material. One side of the negative electrode current collector 34*a* of each negative electrode 34 protrudes from the negative electrode 34. The protruding negative electrode current collector 34*a* is electrically connected to a strip-shaped negative electrode terminal 36. The front end of the strip-shaped negative electrode terminal 36 is drawn from the exterior member 32 to the outside. Although not illustrated, in the positive electrode current collector 33*a* of the positive electrode 33, the side located opposite to the protruding side of the negative electrode current collector 34*a* protrudes from the positive electrode 33. The positive electrode current collector 33*a* protruding from the positive electrode 33 is electrically connected to the strip-shaped positive electrode terminal 37.

The front end of the strip-shaped positive electrode terminal 37 is located on an opposite side to the negative electrode terminal 36, and is drawn from the side of the exterior member 32 to the outside.

The material, a mixture ratio, dimensions, and the like of each member included in the nonaqueous electrolyte secondary battery 30 illustrated in FIG. 4 and FIG. 5 are configured to be the same as those of each constituent member of the nonaqueous electrolyte secondary battery 20 described in FIG. 2 and FIG. 3.

According to the present embodiment described above, it is possible to provide the nonaqueous electrolyte secondary battery.

The nonaqueous electrolyte secondary battery according to the present embodiment includes the negative electrode, the positive electrode, the nonaqueous electrolyte, the separator and the exterior material. The negative electrode is the aforementioned negative electrode for a nonaqueous electrolyte secondary battery according to the first embodiment. The electrode mixture layer, which constitutes the negative electrode for a nonaqueous electrolyte secondary battery, is characterized in that the silicon concentrations in the vicinity of the surface having contact with the current collector and the vicinity of the opposite surface to the surface having contact with the current collector are higher than the silicon concentration at the central part in the thickness direction. For this reason, in the nonaqueous electrolyte secondary battery according to the present embodiment, it is possible to suppress the volume change of the negative electrode containing silicon and silicon oxide which is associated with the insertion and desorption of lithium in charge and discharge cycle, and it is possible to prevent an internal short circuit from occurring in the nonaqueous electrolyte secondary battery.

Third Embodiment

Next, the nonaqueous electrolyte secondary battery pack according to the third embodiment is described in detail.

The nonaqueous electrolyte secondary battery pack according to the present embodiment includes at least one nonaqueous electrolyte secondary battery according to the aforementioned second embodiment (i.e. a single battery). When the plurality of single batteries are included in the nonaqueous electrolyte secondary battery pack, the respective single batteries are disposed so as to be electrically connected in series, in parallel, or in series and parallel.

Figure 6:
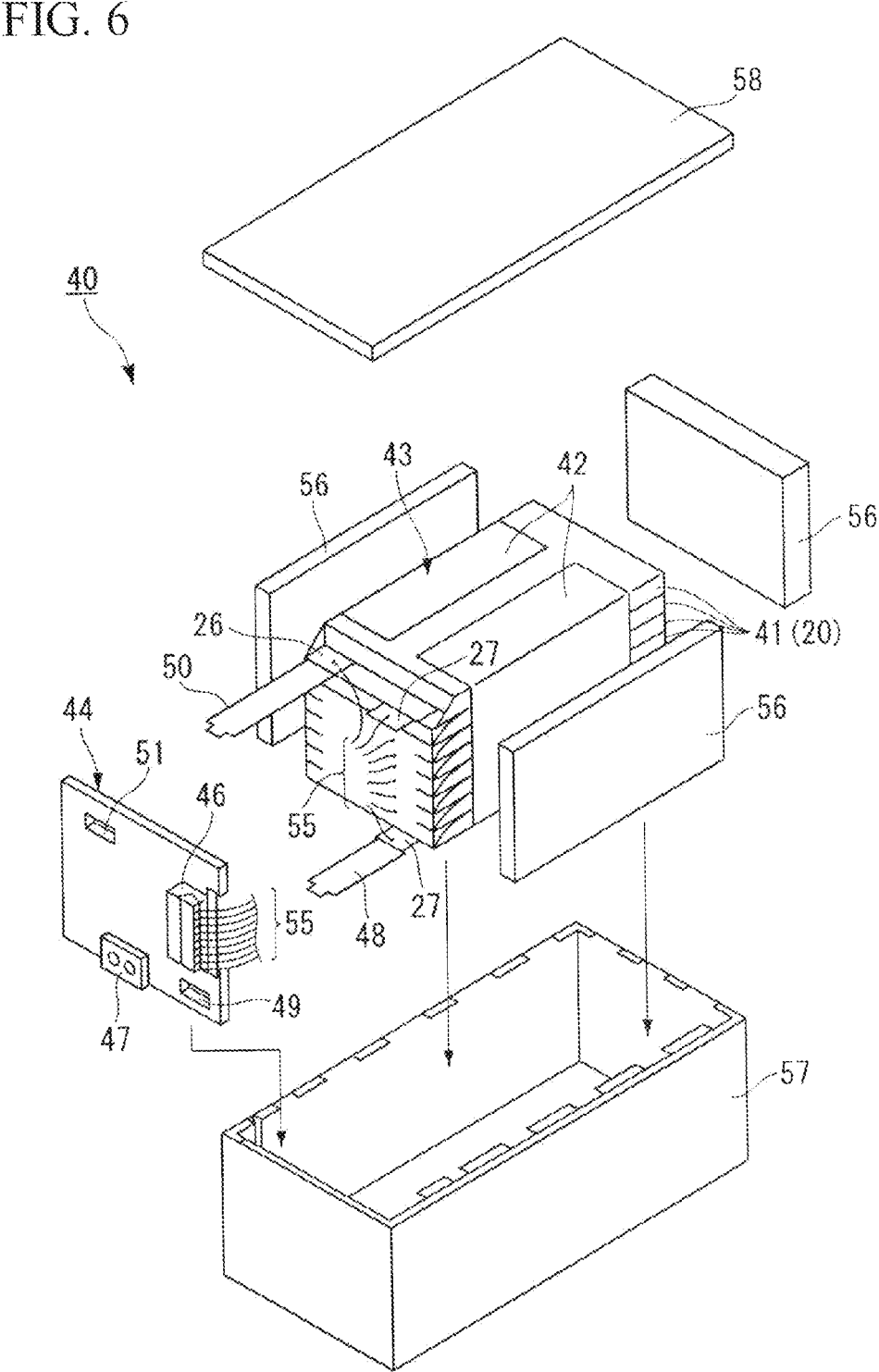
FIG. 6 is a schematic perspective view illustrating the battery pack according to the third embodiment.
Figure 7:
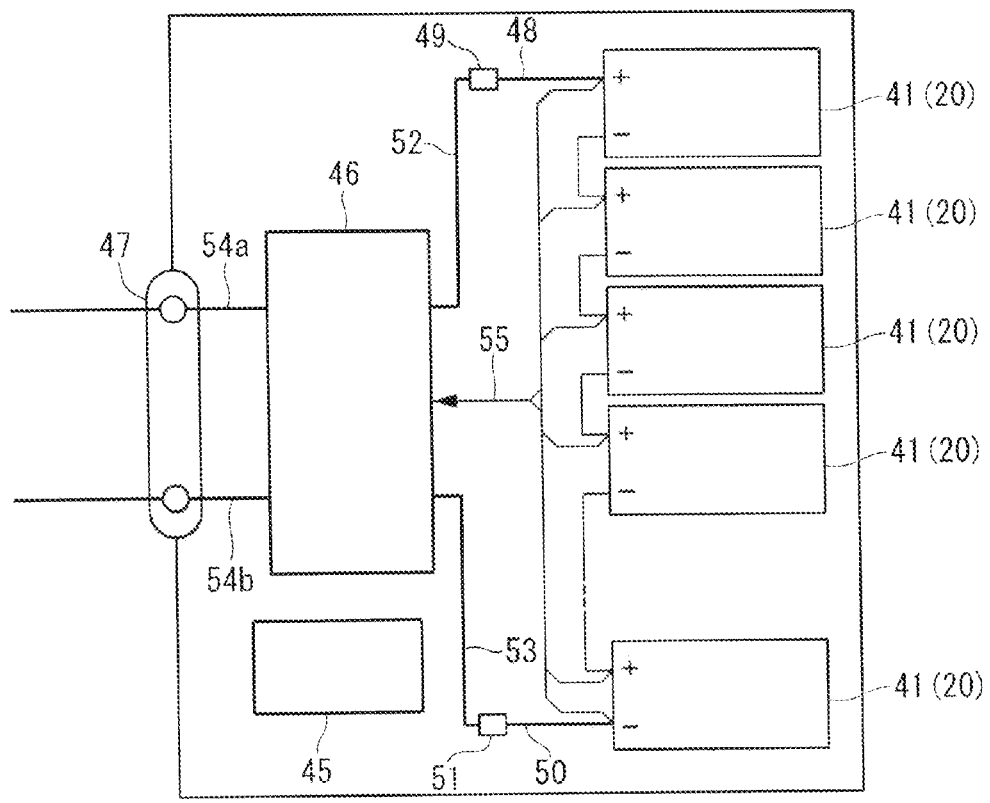
FIG. 7 is a schematic view illustrating the battery pack according to the third embodiment.

Referring to FIG. 6 and FIG. 7, the nonaqueous electrolyte secondary battery pack 40 according to the present embodiment is described in detail. In the battery pack 40 illustrated in FIG. 6, the flat type nonaqueous electrolyte battery 20 illustrated in FIG. 2 is used as the single battery 41.

The plurality of single batteries 41 are laminated so that the negative electrode terminals 26 and the positive electrode terminals 27 extending to the outside are arranged in the same direction, and thus the assembled batteries 43 are configured by fastening with the adhesive tape 42. These single batteries 41 are connected mutually and electrically in series, as illustrated in FIG. 6 and FIG. 7.

The printed wiring board 44 is disposed to face the side surfaces of the single batteries 41 in which the negative electrode terminals 26 and the positive electrode terminals 27 extend. As illustrated in FIG. 6, the thermistor 45 (see FIG. 7), the protective circuit 46 and the electrifying terminal 47 to an external device are mounted on the printed wiring board 44. Herein, an insulation plate (not illustrated) is mounted on the surface of the printed wiring board 44 facing the assembled batteries 43 in order to avoid unnecessary connection with wirings of the assembled batteries 43.

The positive electrode-side lead 48 is connected to the positive electrode terminal 27 located in the lowermost layer of the assembled batteries 43, and the front end of the positive electrode-side lead 48 is inserted into the positive electrode-side connector 49 of the printed wiring board 44 to be electrically connected.

The negative electrode-side lead 50 is connected to the negative electrode terminal 26 located in the uppermost layer of the assembled batteries 43, and the front end of the negative electrode-side lead 50 is inserted into the negative electrode-side connector 51 of the printed wiring board 44 to be electrically connected.

These positive electrode-side connector 49 and negative electrode-side connector 51 are connected to the protective circuit 46 via wirings 52 and 53 (see FIG. 7) formed in the printed wiring board 44.

The thermistor 45 is used to detect a temperature of the single battery 41. Although not illustrated in FIG. 6, the thermistor 45 is installed near the single batteries 41, and a detection signal is transmitted to the protective circuit 46. The protective circuit 46 can block the plus-side wiring 54a and the minus-side wiring 54b between the protective circuit 46 and the electrifying terminal 47 for an external device under a predetermined condition. Here, for example, the predetermined condition means that the detection temperature of the thermistor 45 becomes equal to or greater than a predetermined temperature. In addition, the predetermined condition also means that an overcharge, overdischarge, overcurrent, or the like of the single battery 41 be detected. The detection of the overcharge or the like is performed for the respective single batteries 41 or all of the single batteries 41. Herein, when the overcharge or the like is detected in the respective single batteries 41, a battery voltage may be detected, or a positive electrode potential or a negative electrode potential may be detected. In the latter case, a lithium electrode used as a reference electrode is inserted into the respective single batteries 41. In the case of FIG. 6 and FIG. 7, wirings 55 for voltage detection are connected to the respective single batteries 41 and detection signals are transmitted to the protective circuit 46 via the wirings 55.

As illustrated in FIG. 6, the protective sheets 56 formed of rubber or resin are disposed on three side surfaces of the assembled batteries 43 excluding the side surface from which the positive electrode terminals 27 and the negative electrode terminals 26 protrude.

The assembled batteries 43 are stored together with the respective protective sheets 56 and the printed wiring hoard 44 in the storing container 57. That is, the protective sheets 56 are disposed on both of the inner surfaces of the storing container 57 in the longer side direction and the inner surface in the shorter side direction, and the printed wiring board 44 is disposed on the inner surface opposite to the protective sheet 56 in the shorter side direction. The assembled batteries 43 are located in a space surrounded by the protective sheets 56 and the printed wiring board 44. The cover 58 is mounted on the upper surface of the storing container 57.

When the assembled batteries 43 are fixed, a thermal shrinkage tape may be used instead of the adhesive tape 42. In this case, protective sheets are disposed on both side surfaces of the assembled batteries, the thermal shrinkage tape is circled, and then the thermal shrinkage tape is subjected to thermal shrinkage, so that the assembled batteries are fastened.

Here, in FIG. 6 and FIG. 7, the single batteries 41 connected in series are illustrated. However, to increase a battery capacity, the single batteries 41 may be connected in parallel or may be connected in a combination form of series connection and parallel connection. The assembled battery packs can also be connected in series or in parallel.

According to the aforementioned present embodiment, it is possible to provide the nonaqueous electrolyte secondary battery pack. The nonaqueous electrolyte secondary battery pack according to the present embodiment includes at least one of the aforementioned nonaqueous electrolyte secondary battery according to the second embodiment.

This kind of nonaqueous electrolyte secondary battery pack can show low internal resistance and high durability at high temperature.

Herein, the form of the nonaqueous electrolyte secondary battery pack can be appropriately modified according to a use application. A use application of the nonaqueous electrolyte secondary battery pack according to the embodiment is preferably one which is required to show excellent cycle characteristics when a large current is extracted. Specifically, the battery pack can be used for power of digital cameras, a two-wheeled or four-wheeled hybrid electric vehicle, a two-wheeled or four-wheeled electric vehicle, an assist bicycle, and the like. In particular, the nonaqueous electrolyte secondary battery pack using the nonaqueous electrolyte secondary batteries with excellent high temperature characteristics is appropriately used for vehicles.

EXAMPLES

Hereinafter, the aforementioned embodiments are described on the basis of the examples.

Example 1

Production of First Particle

As $SiO_y$, which was the raw material of silicon, the amorphous SiO having the average particle size of 300 nm was used, and graphite and furfuryl alcohol were used as the raw materials of the carbonaceous material.

The mixing ratio of the amorphous SiO, graphite and furfuryl alcohol was set to the mass ratio of SiO:graphite:furfuryl alcohol=3:0.5:5.

To the furfuryl alcohol, the water whose mass ratio to the furfuryl alcohol was 1/10 was added, and graphite and SiO were added to the furfuryl alcohol aqueous solution in this order, followed by stirring and mixing.

Then, to the mixture, the dilute hydrochloric acid whose mass ratio to the furfuryl alcohol was 1/10 was added. Then, the mixture was stirred, mixed and allowed to stand, to thereby polymerize and solidify the furfuryl alcohol. In this manner, the solid product containing the amorphous SiO, graphite and the polymer of furfuryl alcohol was obtained.

The obtained solid product was burned by holding it at 1,100° C. for 3 hours under an argon atmosphere.

After cooling the burned product to room temperature, the burned product was pulverized by a pulverizer until the average particle size became 5 μm, to thereby obtain the first particle.

(Production of Negative Electrode Mixture Layer)

As the dispersion medium, 55 parts by mass of NMP was mixed with 100 parts by mass of the mixture of the obtained first particle 72 mass %, graphite 12 mass %, which was the second particle, and the imide binder 16 mass %, to thereby produce the negative electrode slurry.

Subsequently, the negative electrode slurry was applied on the copper foil having the thickness of 12 μm so as to form the sheet-shaped negative electrode mixture layer. Then, the sheet-shaped negative electrode mixture layer was dried at 120° C. in air.

The negative electrode mixture layer was rolled at the pressure of 3.5 t/cm², and then was subjected to the thermal treatment at 400° C. for 1 hour under an argon atmosphere, to thereby obtain the negative electrode.

Herein, the second particle had the average particle size of 3.1 μm, the 10% diameter of the particle size distribution of 1.8 μm and the 90% diameter of the particle size distribution of 6.5 μm.

(Production of Positive Electrode Mixture Layer)

As the positive electrode active material, the mixed powder was obtained by mixing lithium-containing nickel cobalt manganese oxide ($LiNi_{0.8}CO_{0.1}Mn_{0.1}O_2$) and the $LiCoO_2$ at the mass ratio of 4:1. As the dispersion medium, 46 parts by mass of NMP was mixed with 100 parts by mass of the mixture of the obtained mixed powder 69.5 mass %, the efficiency conditioner 23.1 mass %, carbon 4.6 mass %, which was the electroconductive auxiliary agent assistant, and polyvinylidene fluoride 2.8 mass % which was binder 100, to thereby produce the positive electrode slurry.

Subsequently, the positive electrode slurry was applied onto the copper foil having the thickness of 12 μm so as to form the sheet-shaped negative electrode mixture layer. Then, the sheet-shaped positive electrode mixture layer was dried at 120° C. in air.

Then, the positive electrode mixture layer was rolled at the pressure of 3.5 t/cm², to thereby obtain the positive electrode.

(Production of Test Cell)

The negative electrode obtained in the aforementioned manner was cut into a predetermined size, to thereby obtain the test negative electrode.

Also, the positive electrode obtained in the aforementioned manner was cut into a predetermined size, to thereby obtain the test positive electrode.

These negative electrode and positive electrode were laminated through the cellulosic separator having the thickness of 20 μm, and moreover, a plurality of the laminated products were laminated and rolled. Then, the rolled product was wrapped with aluminum laminate film.

Also, the 1 mol/L solution, which was produced by dissolving $LiPF_6$ in the mixed solvent of ethylene carbonate (EC) and diethyl carbonate (DEC) (EC:DEC=1:2 (volume ratio)), was used as the nonaqueous electrolyte.

Also, to 100 parts by mass of the nonaqueous electrolyte, 2 parts by mass of the mixture of fluoroethylene carbonate (FEC) and vinylene carbonate (VC) (FEC:VC=1:1 (mass ratio)) was added as an additive.

Then, under an argon atmosphere, the aforementioned nonaqueous electrolyte was poured in the electrode group wrapped with the aluminum laminate film, and the electrode group was vacuum-sealed, to thereby produce the test cell.

(Safety Test)

Using the test cell obtained in the aforementioned manner, the charge and discharge cycle was carried out once between 4.3 V and 2.0 V at the rate of 0.1 C, and the capacity thereof was confirmed. Then, the test cell was charged up to 4.2 V at the rate of 0.2 C. Then, the nail, which had a length of 120 mm, a f-number of 5.0 and a diameter of the conical part of the tip of 10 mm, was stabbed at the center of the test cell at the rate of 6 mm/sec until the nail penetrated through the test cell, and the behavior of the test cell (temperature increasing rate) was observed. Herein, the temperature increasing rate of the test cell was shown as the magnification of a temperature increased with respect to room temperature while setting room temperature as the reference (1). The results are shown in Table 1.

(Electron Microscope Observation)

Figure 8:
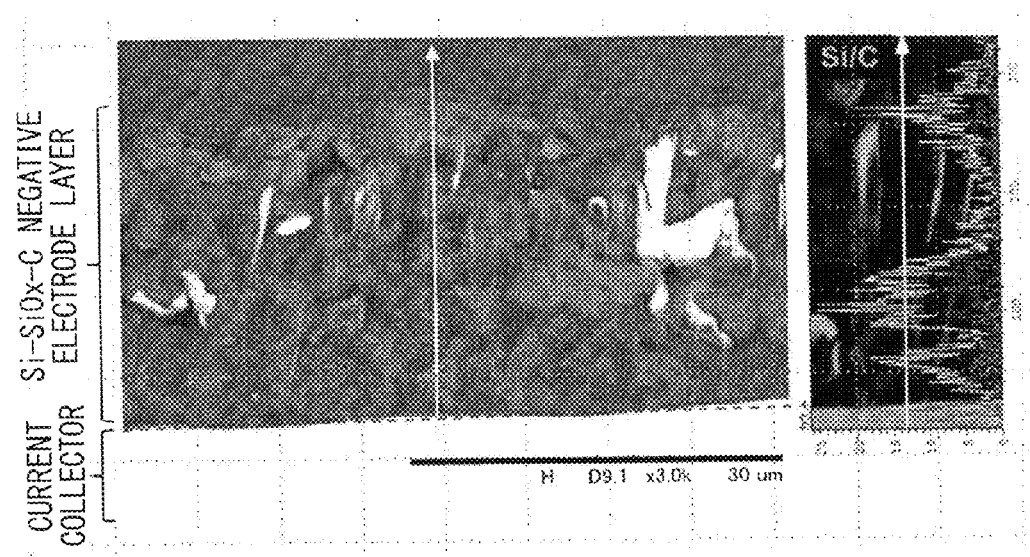
FIG. 8 is the scanning electron micrograph of the cross-sectional surface in the thickness direction of the negative electrode mixture layer of Example 1, and the graph showing the concentration distributions of silicon and carbon in the thickness direction of the negative electrode mixture layer.

The electrode cut surface was formed in negative electrode mixture layer of the negative electrode by an ion milling apparatus using argon ions. Then, the electrode cut surface was observed using a scanning electron microscope (SEM), and the silicon (Si) concentration and the carbon (C) concentration in the negative electrode mixture layer were measured by an energy dispersive X-ray spectrometry (EDX). In this manner, the ratio of the Si-containing first particle and the C-containing second particle was measured in the negative electrode mixture layer from the side of the surface having contact with the copper foil toward the side of the opposite surface to the surface having contact with the copper foil. The results are shown in FIG. 8. Also, Table 1 shows the presence or absence of the concentration distributions of the Si-containing first particle and the C-containing second particle in the negative electrode mixture layer from the side of the surface having contact with the copper foil toward the side of the opposite surface to the surface having contact with the copper foil (the side of the surface having contact with the separator).

Example 2

The first particle was produced in the same manner as Examples 1. As the dispersion medium, 55 parts by mass of NMP was mixed with 100 parts by mass of the mixture of the obtained first particle 42 mass %, graphite 42 mass %, which was the second particle, and the imide binder 16 mass %, to thereby produce the negative electrode slurry.

Then, the negative electrode was produced in the same manner as Examples 1.

Also, the positive electrode was produced in the same manner as Examples 1.

Moreover, the test cell was produced in the same manner as Examples 1.

The obtained test cell was subjected to the safety test and the electron microscope observation in the same manner as Examples 1. The results are shown in Table 1.

Example 3

Production of First Particle

As $SiO_y$ which was the raw material of silicon, Si having the average particle size of 40 nm was used, and the resole resin and the naphthol resin were used as the raw materials of the carbonaceous material.

Si, the resole resin and the naphthol were mixed at the mass ratio of Si:the resole resin:the naphthol=52:33.5:14.5.

NMP was added to the mixture, and the mixture was heated so as to be solidified.

The obtained solid product was pulverized by a pulverizer until the average particle size became 6 μm, to thereby obtain the first particle.
(Production of Negative Electrode Mixture Layer)

As the dispersion medium, 55 parts by mass of NMP was mixed with 100 parts by mass of the mixture of the obtained first particle 42 mass %, graphite 42 mass %, which was the second particle, and the imide binder 16 mass %, to thereby produce the negative electrode slurry.

Subsequently, the negative electrode slurry was applied on the stainless steel foil having the thickness of 10 μm so as to form the sheet-shaped negative electrode mixture layer. Then, the sheet-shaped negative electrode mixture layer was dried at 120° C. in air.

The negative electrode mixture layer was rolled at the pressure of 3.5 t/cm², and then was subjected to the thermal treatment at 400° C. for 1 hour under an argon atmosphere, to thereby obtain the negative electrode.

Herein, the same material as in Example 1 was used as the second particle.

Then, the positive electrode was produced in the same manner as Examples 1.

Also, the test cell was produced in the same manner as Examples 1.

The obtained test cell was subjected to the safety test and the electron microscope observation in the same manner as Examples 1. The results are shown in Table 1.

Comparative Example 1

The first particle was produced in the same manner as Examples 1. As the dispersion medium, 55 parts by mass of NMP was mixed with 100 parts by mass of the mixture of the obtained first particle 24 mass %, graphite 60 mass %, which was the second particle, and the imide binder 16 mass %, to thereby produce the negative electrode slurry.

Then, the negative electrode was produced in the same manner as Examples 1.

Also, the positive electrode was produced in the same manner as Examples 1.

Moreover, the test cell was produced in the same manner as Examples 1.

The obtained test cell was subjected to the safety test and the electron microscope observation in the same manner as Examples 1. The results are shown in Table 1.

Comparative Example 2

In the same manner as Example 1, the burned product containing the amorphous SiO, graphite and the polymer of furfuryl alcohol was produced. After cooling the burned product to room temperature, the burned product was pulverized by a pulverizer until the average particle size became 0.765 μm, to thereby obtain the first particle.

The obtained first particle was used to produce the negative electrode slurry in the same manner as Example 1.

Then, the negative electrode was produced in the same manner as Examples 1.

Also, the positive electrode was produced in the same manner as Examples 1.

Moreover, the test cell was produced in the same manner as Examples 1.

The obtained test cell was subjected to the safety test and the electron microscope observation in the same manner as Examples 1. The results are shown in Table 1.

TABLE 1

|  | Average Particle Size of First Particle (μm) | 10% Diameter of Particle Size Distribution (μm) | 90% Diameter of Particle Size Distribution (μm) | Mass Ratio of First Particle/ (First Particle + Second particle) (%) | Concentration Distribution | Temperature Increasing Rate (Based on Room Temperature) (Magnification) |
|---|---|---|---|---|---|---|
| Example 1 | 5.075 | 1.528 | 10.63 | 85.7 | presence | 1.69 |
| Example 2 | 5.075 | 1.528 | 10.63 | 50.1 | presence | 2.63 |
| Example 3 | 6.007 | 1.410 | 14.61 | 50.0 | presence | 2.84 |
| Comparative Example 1 | 5.075 | 1.528 | 10.63 | 28.6 | presence | 22.7 |

TABLE 1-continued

|  | Average Particle Size of First Particle (μm) | 10% Diameter of Particle Size Distribution (μm) | 90% Diameter of Particle Size Distribution (μm) | Mass Ratio of First Particle/ (First Particle + Second particle) (%) | Concentration Distribution | Temperature Increasing Rate (Based on Room Temperature) (Magnification) |
|---|---|---|---|---|---|---|
| Comparative Example 2 | 0.765 | 0.431 | 2.876 | 85.7 | absence | 22.5 |

From the results shown in Table 1, it was confirmed that the concentration distributions of the silicon and the carbon existed in the thickness direction of the negative electrode mixture layer from the side of the surface having contact with the negative electrode current collector made of the copper foil or the stainless steel foil toward the side of the opposite surface to the surface having contact with the negative electrode current collector in Examples 1-3 and Comparative Example 1. Also, it was confirmed that the silicon concentrations were high and the carbon concentrations were low on the sides of the surface of the negative electrode mixture layer having contact with the negative electrode current collector and the opposite surface to the surface of the negative electrode mixture layer having contact with the negative electrode current collector (the side of the surface having contact with the separator). Also, it was confirmed that the silicon concentration was low and the carbon concentration was high at the central part of the negative electrode mixture layer.

In Examples 1 to 3 and Comparative Example 1, the particle size distribution of the first particle was wider than the particle size distribution of the secondary particle. Also, the solid content ratio in the slurry was low, and the viscosity was low. Therefore, when the slurry was applied onto the negative electrode current collector 11, among the first particles, the particles having a large particle diameter sank to the side of the negative electrode current collector, i.e. the lower part side of the negative electrode mixture layer. Meanwhile, among the first particles, the particles having a small particle diameter float to the side of the separator, i.e. the upper part side of the negative electrode mixture layer. For these reasons, the aforementioned concentration distributions of silicon and carbon were obtained. In this manner, when the first particles are unevenly distributed at the upper part and the lower part of the negative electrode mixture layer, the concentration of the carbon-containing second particle is increased at the central part of the negative electrode mixture layer 12 as a consequence.

On the other hand, in Comparative Example 2, the particle size distribution of the first particle was narrower than the particle size distribution of the second particle. Also, because the specific surface area of the first particle was large, the viscosity of the negative electrode slurry was high. For these reasons, the concentration distribution of the first particle as in Examples 1 to 3 and Comparative Example 1 did not occur in the negative electrode mixture layer.

In Examples 1 to 3, the first particle has the concentration distribution, and the ratio of the mass of the first particle to the total mass of the first particle and the second particle was 50% or more. Therefore, in the safety test (nail penetration test), the moderate increase in temperature occurred, and this increase in temperature was less than four times of room temperature (less than 100° C.). Also, although the voltage was lowered by a small internal short circuit of the test cell, the ignition, smoking and expansion of the test cell did not occur. When the internal short circuit was caused by penetrating the nail into the test cell, the first particles which exist in the periphery of the nail were discharged, and the electron conductivity of the silicon contained in the first particle was lowered. Therefore, the resistance was locally increased in the periphery of the internal short circuit part, to thereby prevent a current from flowing excessively. For these reasons, the aforementioned test results were obtained.

On the other hand, in Comparative Example 1, the first particle had the concentration distribution in the negative electrode mixture layer, but the mass ratio of the first particle to the total mass of the first particle and the second particle was less than 50%. Therefore, in the safety test (nail penetration test), the rapid increase in temperature occurred, and this increase in temperature was not less than 22 times of room temperature (not less than 400° C.). When the internal short circuit was caused by penetrating the nail into the test cell, the first particles which exist in the periphery of the nail were discharged, and the electron conductivity of the first particle was lowered. However, because the electroconductivity was secured by the carbon contained in the second particle, an excessive current flowed through the test cell. Therefore, the test cell excessively generated the heat, and the test cell was ignited.

From the aforementioned results, it was confirmed that the safety of the test cell, which is obtained by using the negative electrode containing the first particle and the second particle, can be improved when the silicon-containing first particle has the concentration distribution in the thickness direction of the negative electrode mixture layer from the side of the surface having contact with the negative electrode current collector toward the side of the opposite surface to the surface having contact with the negative electrode current collector, and the mass ratio of the first particle to the total mass of the first particle and the second particle is 50% or more as shown in Examples 1-3.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A negative electrode for a nonaqueous electrolyte secondary battery comprising:
 a current collector; and
 an electrode mixture layer which that is formed on the current collector and contains a first particle, a second particle and a binder, wherein
 the first particle is comprised of silicon, a silicon oxide and a carbonaceous material, the second particle has electron conductivity and an oxygen content of 1% or lower, and the electrode mixture layer is characterized in that silicon concentrations in the vicinity of the surface having contact with the current collector and the vicinity of the opposite surface to the surface having contact with the current collector are higher than a silicon concentration at the central part in the thickness direction.

2. The negative electrode for a nonaqueous electrolyte secondary battery according to claim 1, wherein the electrode mixture layer is characterized in that first particle concentrations are higher than second particle concentrations in the vicinity of the surface having contact with the current collector and the vicinity of the opposite surface to the surface having contact with the current collector in the thickness direction, and that the second particle concentration is higher than the first particle concentration at the central part in the thickness direction.

3. The negative electrode for a nonaqueous electrolyte secondary battery according to claim 1, wherein a first particle content is 50 mass % or higher when the total mass of the first particle and the second particle is defined as 100 mass %.

4. The negative electrode for a nonaqueous electrolyte secondary battery according to claim 1, wherein 10% diameter of a particle size distribution of the first particle is less than 10% diameter of a particle size distribution of the second particle, and 90% diameter of the particle size distribution of the first particle is more than 90% diameter of the particle size distribution of the second particle.

5. The negative electrode for a nonaqueous electrolyte secondary battery according to claim 4, wherein 10% diameter of a particle size distribution of the first particle is less than 3.1 μm, 90% diameter of the particle size distribution of the first particle is 6 μm or μm, 10% diameter of the particle size distribution of the second particle is 3.1 μm or less, and 90% diameter of the particle size distribution of the second particle is 5 μm or more.

6. A nonaqueous electrolyte secondary battery comprising:

an exterior material;

a positive electrode that is housed in the external material;

a separator that is housed in the external material;

a negative electrode that is spatially separated from the positive electrode in the external material and is comprised of the negative electrode for a nonaqueous electrolyte secondary battery according to claim 1; and a nonaqueous electrolyte charged in the external material.

* * * * *